US011172361B2

(12) United States Patent
Oberheide et al.

(10) Patent No.: US 11,172,361 B2
(45) Date of Patent: *Nov. 9, 2021

(54) SYSTEM AND METHOD OF NOTIFYING MOBILE DEVICES TO COMPLETE TRANSACTIONS

(71) Applicant: Duo Security, Inc., Ann Arbor, MI (US)

(72) Inventors: Jon Oberheide, Ann Arbor, MI (US); Douglas Song, Ann Arbor, MI (US); Adam Goodman, Ann Arbor, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 16/138,007

(22) Filed: Sep. 21, 2018

(65) Prior Publication Data

US 2019/0028467 A1 Jan. 24, 2019

Related U.S. Application Data

(63) Continuation of application No. 15/971,193, filed on May 4, 2018, now Pat. No. 10,129,250, which is a (Continued)

(51) Int. Cl.
*H04W 12/06* (2021.01)
*H04L 9/32* (2006.01)
(Continued)

(52) U.S. Cl.
CPC .......... *H04W 12/06* (2013.01); *G06F 21/305* (2013.01); *G06F 21/31* (2013.01); *G06F 21/32* (2013.01);
(Continued)

(58) Field of Classification Search
CPC ........ H04W 12/06; H04W 12/08; H04L 9/32; H04L 9/321; H04L 63/083; H04L 63/0853; G06F 21/305; G06F 21/31
See application file for complete search history.

(56) References Cited

U.S. PATENT DOCUMENTS

| 2,639,997 A | 5/1953 | Francis |
| 5,754,763 A | 5/1998 | Bereiter |

(Continued)

FOREIGN PATENT DOCUMENTS

| WO | 2007/072001 A1 † | 6/2007 |
| WO | 2007075850 A2 | 7/2007 |
| WO | 2014150073 A2 | 9/2014 |

OTHER PUBLICATIONS

S. Hallsteinsen, I. Jorstad and D. V. Thanh, "Using the mobile phone as a security token for unified authentication," 2007 Second International Conference on Systems and Networks Communications (ICSNC 2007), 2007, pp. 68-68, (Year: 2007).*

(Continued)

*Primary Examiner* — Kari L Schmidt

(57) ABSTRACT

A method including registering an authority device for an account on an auth platform; receiving transaction request from an initiator to the auth platform; messaging the authority device with the transaction request; receiving an authority agent response from the authority device to the auth platform; if the authority agent response confirms the transaction, communicating a confirmed transaction to the initiator; and if the authority agent response denies the transaction, communicating a denied transaction to the initiator.

20 Claims, 5 Drawing Sheets

Related U.S. Application Data continuation of application No. 15/363,468, filed on Nov. 29, 2016, now Pat. No. 9,992,194, which is a continuation of application No. 13/039,209, filed on Mar. 2, 2011, now Pat. No. 9,544,143.

(60) Provisional application No. 61/309,885, filed on Mar. 3, 2010.

(51) Int. Cl.

| | | |
|---|---|---|
| *G06F 21/30* | (2013.01) | |
| *G06F 21/31* | (2013.01) | |
| *H04W 12/08* | (2021.01) | |
| *G06F 21/32* | (2013.01) | |
| *H04L 29/06* | (2006.01) | |

(52) U.S. Cl.
CPC ............... *H04L 9/32* (2013.01); *H04L 9/321* (2013.01); *H04L 63/083* (2013.01); *H04L 63/0853* (2013.01); *H04W 12/08* (2013.01)

(56) References Cited

U.S. PATENT DOCUMENTS

| | | | |
|---|---|---|---|
| 5,838,792 | A | 11/1998 | Ganesan |
| 5,870,723 | A | 2/1999 | Pare et al. |
| 6,119,096 | A | 9/2000 | Mann et al. |
| 6,209,091 | B1 | 3/2001 | Sudia et al. |
| 6,311,272 | B1 | 10/2001 | Gressel |
| 6,662,205 | B1 | 12/2003 | Bereiter |
| 6,694,025 | B1 | 2/2004 | Epstein et al. |
| 6,758,394 | B2 | 7/2004 | Maskatiya et al. |
| 6,823,359 | B1 | 11/2004 | Heidingsfeld et al. |
| 6,934,858 | B2 | 8/2005 | Woodhill |
| 6,956,950 | B2 | 10/2005 | Kausik |
| 6,990,591 | B1 | 1/2006 | Pearson |
| 6,996,716 | B1 | 2/2006 | Hsu |
| 7,000,247 | B2 | 2/2006 | Banzhof |
| 7,093,133 | B2 | 8/2006 | Hopkins et al. |
| 7,096,354 | B2 | 8/2006 | Wheeler et al. |
| 7,107,246 | B2 | 9/2006 | Wang |
| 7,146,009 | B2 | 12/2006 | Andivahis et al. |
| 7,172,115 | B2 | 2/2007 | Lauden |
| 7,213,260 | B2 | 5/2007 | Judge |
| 7,331,518 | B2 | 2/2008 | Rable |
| 7,334,255 | B2 | 2/2008 | Lin et al. |
| 7,340,600 | B1 | 3/2008 | Corella |
| 7,374,079 | B2 * | 5/2008 | Nam .................... G06Q 20/04 235/379 |
| 7,386,720 | B2 | 6/2008 | Sandhu et al. |
| 7,447,784 | B2 | 11/2008 | Eun |
| 7,463,637 | B2 | 12/2008 | Bou-Diab et al. |
| 7,483,384 | B2 | 1/2009 | Bryant et al. |
| 7,496,662 | B1 | 2/2009 | Roesch et al. |
| 7,526,792 | B2 | 4/2009 | Ross |
| 7,562,382 | B2 | 7/2009 | Hinton et al. |
| 7,562,385 | B2 | 7/2009 | Thione et al. |
| 7,571,471 | B2 | 8/2009 | Sandhu et al. |
| 7,574,733 | B2 | 8/2009 | Woodhill |
| 7,599,493 | B2 | 10/2009 | Sandhu et al. |
| 7,630,493 | B2 | 12/2009 | Sandhu et al. |
| 7,711,122 | B2 | 5/2010 | Allen et al. |
| 7,716,240 | B2 | 5/2010 | Lim |
| 7,764,970 | B2 | 7/2010 | Neil et al. |
| 7,793,110 | B2 | 9/2010 | Durfee et al. |
| 7,836,501 | B2 | 11/2010 | Sobel et al. |
| 7,904,608 | B2 | 3/2011 | Price |
| 7,953,979 | B2 | 5/2011 | Borneman et al. |
| 7,958,362 | B2 | 6/2011 | Hwang |
| 7,961,645 | B2 | 6/2011 | Gudipudi et al. |
| 7,982,595 | B2 | 7/2011 | Hanna et al. |
| 7,983,987 | B2 | 7/2011 | Kranzley et al. |
| 8,001,610 | B1 | 8/2011 | Chickering et al. |
| 8,010,779 | B2 | 8/2011 | Sermersheim et al. |
| 8,028,329 | B2 | 9/2011 | Whitcomb |
| 8,099,368 | B2 | 1/2012 | Coulter et al. |
| 8,136,148 | B1 | 3/2012 | Chayanam et al. |
| 8,141,146 | B2 | 3/2012 | Ozeki |
| 8,151,333 | B2 | 4/2012 | Zhu et al. |
| 8,161,527 | B2 | 4/2012 | Curren |
| 8,185,744 | B2 | 5/2012 | Brown et al. |
| 8,200,980 | B1 | 6/2012 | Robinson et al. |
| 8,225,392 | B2 | 7/2012 | Dubrovsky et al. |
| 8,245,044 | B2 | 8/2012 | Kang |
| 8,259,947 | B2 | 9/2012 | Gantman et al. |
| 8,332,627 | B1 | 12/2012 | Matthews et al. |
| 8,335,933 | B2 | 12/2012 | Humphrey et al. |
| 8,340,287 | B2 | 12/2012 | Sandhu et al. |
| 8,340,635 | B2 | 12/2012 | Herz et al. |
| 8,380,192 | B2 | 2/2013 | Kim et al. |
| 8,397,301 | B2 | 3/2013 | Hering et al. |
| 8,397,302 | B2 | 3/2013 | Mont et al. |
| 8,402,526 | B2 | 3/2013 | Ahn |
| 8,418,168 | B2 | 4/2013 | Tyhurst et al. |
| 8,458,798 | B2 | 6/2013 | Williams et al. |
| 8,484,708 | B2 | 7/2013 | Chern |
| 8,495,720 | B2 | 7/2013 | Counterman |
| 8,499,149 | B2 | 7/2013 | Chen |
| 8,499,339 | B2 | 7/2013 | Chao et al. |
| 8,510,820 | B2 | 8/2013 | Oberheide et al. |
| 8,522,010 | B2 | 8/2013 | Ozzie et al. |
| 8,528,039 | B2 | 9/2013 | Chakarapani |
| 8,538,028 | B2 | 9/2013 | Goeller et al. |
| 8,539,544 | B2 | 9/2013 | Srinivasan et al. |
| 8,539,567 | B1 | 9/2013 | Luxemberg et al. |
| 8,548,426 | B2 | 10/2013 | Smith |
| 8,549,601 | B2 | 10/2013 | Ganesan |
| 8,571,220 | B2 | 10/2013 | Ollikainen et al. |
| 8,578,162 | B2 | 11/2013 | Jentzsch et al. |
| 8,588,422 | B2 | 11/2013 | Beachem et al. |
| 8,595,809 | B2 | 11/2013 | Chayanam et al. |
| 8,595,822 | B2 | 11/2013 | Schrecker et al. |
| 8,601,554 | B2 | 12/2013 | Gordon et al. |
| 8,612,305 | B2 | 12/2013 | Dominguez et al. |
| 8,627,438 | B1 | 1/2014 | Bhimanaik |
| 8,646,060 | B1 | 2/2014 | Ben Ayed |
| 8,646,086 | B2 | 2/2014 | Chakra et al. |
| 8,667,288 | B2 | 3/2014 | Yavuz |
| 8,689,287 | B2 | 4/2014 | Bohmer et al. |
| 8,700,729 | B2 | 4/2014 | Dua |
| 8,707,365 | B2 | 4/2014 | Corl |
| 8,707,384 | B2 | 4/2014 | Jain et al. |
| 8,713,329 | B2 | 4/2014 | Schneider |
| 8,713,639 | B2 | 4/2014 | Cheeniyil et al. |
| 8,719,930 | B2 | 5/2014 | Lapsley et al. |
| 8,732,475 | B2 | 5/2014 | Fahrny et al. |
| 8,732,839 | B2 | 5/2014 | Hohl |
| 8,737,623 | B2 | 5/2014 | Hart |
| 8,745,703 | B2 | 6/2014 | Lambert et al. |
| 8,751,801 | B2 | 6/2014 | Harris et al. |
| 8,756,651 | B2 | 6/2014 | Baer et al. |
| 8,756,698 | B2 | 6/2014 | Sidagni |
| 8,763,077 | B2 | 6/2014 | Oberheide et al. |
| 8,793,490 | B1 * | 7/2014 | Szwalbenest ....... H04L 63/0853 713/168 |
| 8,806,609 | B2 | 8/2014 | Gladstone et al. |
| 8,806,638 | B1 | 8/2014 | Mani |
| 8,824,455 | B1 * | 9/2014 | Asher ................. H04L 65/1069 370/352 |
| 8,838,759 | B1 | 9/2014 | Eatough et al. |
| 8,850,017 | B2 | 9/2014 | Ebrahimi et al. |
| 8,850,516 | B1 | 9/2014 | Hrebicek et al. |
| 8,850,530 | B2 | 9/2014 | Shahbazi |
| 8,862,097 | B2 † | 10/2014 | Brand |
| 8,891,772 | B2 | 11/2014 | D'Souza et al. |
| 8,893,230 | B2 | 11/2014 | Oberheide et al. |
| 8,898,762 | B2 | 11/2014 | Kang |
| 8,903,365 | B2 | 12/2014 | Stricklen et al. |
| 8,935,769 | B2 | 1/2015 | Hessler |
| 8,938,799 | B2 | 1/2015 | Kuo |
| 8,943,548 | B2 † | 1/2015 | Drokov |
| 8,949,596 | B2 | 2/2015 | Yin et al. |
| 8,949,927 | B2 | 2/2015 | Arnott et al. |
| 8,955,038 | B2 | 2/2015 | Nicodemus et al. |

(56) References Cited

U.S. PATENT DOCUMENTS

| | | |
|---|---|---|
| 8,955,075 B2 | 2/2015 | Von Bokern et al. |
| 8,966,587 B2 | 2/2015 | Nair et al. |
| 8,984,276 B2 | 3/2015 | Benson et al. |
| 9,037,127 B2 | 5/2015 | Raleigh |
| 9,043,886 B2 | 5/2015 | Srinivasan et al. |
| 9,049,011 B1 | 6/2015 | Agrawal |
| 9,049,594 B2 | 6/2015 | Chen et al. |
| 9,071,611 B2 | 6/2015 | Yadav et al. |
| 9,076,343 B2 | 7/2015 | Chaar et al. |
| 9,077,758 B1 | 7/2015 | Mcgovern et al. |
| 9,110,754 B2 | 8/2015 | Poonamalli et al. |
| 9,118,656 B2 | 8/2015 | Ting et al. |
| 9,122,888 B2 | 9/2015 | Devi |
| 9,124,582 B2 | 9/2015 | Kalinichenko et al. |
| 9,135,458 B1 | 9/2015 | Hankins et al. |
| 9,154,387 B2 | 10/2015 | Maki et al. |
| 9,172,545 B2 | 10/2015 | Edstrom et al. |
| 9,189,491 B2 | 11/2015 | Fushman et al. |
| 9,201,644 B2 | 12/2015 | Klein et al. |
| 9,203,841 B2 | 12/2015 | Neuman et al. |
| 9,223,961 B1 | 12/2015 | Sokolov |
| 9,225,840 B2 | 12/2015 | Malatack et al. |
| 9,253,185 B2 | 2/2016 | Alaranta et al. |
| 9,258,296 B2 | 2/2016 | Juthani |
| 9,270,674 B2 | 2/2016 | Lang et al. |
| 9,282,085 B2 | 3/2016 | Oberheide et al. |
| 9,338,156 B2 | 5/2016 | Oberheide et al. |
| 9,338,163 B2 | 5/2016 | Wendling et al. |
| 9,344,275 B2 | 5/2016 | Bar-El et al. |
| 9,374,654 B2 | 6/2016 | Lindeman et al. |
| 9,386,003 B2 | 7/2016 | Kumar |
| 9,391,980 B1 | 7/2016 | Krahn et al. |
| 9,397,892 B2 | 7/2016 | Kirner et al. |
| 9,430,938 B2 | 8/2016 | Proud |
| 9,443,073 B2 | 9/2016 | Oberheide et al. |
| 9,443,084 B2 | 9/2016 | Nice et al. |
| 9,454,365 B2 | 9/2016 | Oberheide et al. |
| 9,479,509 B2 | 10/2016 | Zeuthen |
| 9,501,315 B2 | 11/2016 | Desai et al. |
| 9,544,143 B2 | 1/2017 | Oberheide et al. |
| 9,659,160 B2 | 5/2017 | Ligatti et al. |
| 9,680,864 B2 | 6/2017 | Khesin |
| 9,706,410 B2 | 7/2017 | Sreenivas et al. |
| 9,723,019 B1 | 8/2017 | Rathor |
| 9,754,097 B2 | 9/2017 | Hessler |
| 9,762,429 B2 | 9/2017 | Elmaliah |
| 9,769,538 B2 | 9/2017 | Killick |
| 9,832,221 B1 | 11/2017 | Newstadt et al. |
| 9,918,226 B2 | 3/2018 | Khan |
| 9,940,119 B2 | 4/2018 | Brownell et al. |
| 9,996,343 B2 | 6/2018 | Oberheide et al. |
| 2002/0013898 A1 | 1/2002 | Sudia et al. |
| 2002/0091745 A1 | 7/2002 | Ramamurthy et al. |
| 2002/0123967 A1 | 9/2002 | Wang |
| 2002/0131404 A1 | 9/2002 | Menta et al. |
| 2002/0136410 A1 | 9/2002 | Hanna |
| 2003/0011545 A1 | 1/2003 | Sagano et al. |
| 2003/0012093 A1 | 1/2003 | Tada et al. |
| 2003/0061506 A1 | 3/2003 | Cooper et al. |
| 2003/0115452 A1 | 6/2003 | Sandhu et al. |
| 2003/0120931 A1 | 6/2003 | Hopkins et al. |
| 2003/0126472 A1 | 7/2003 | Banzhof |
| 2003/0147536 A1 | 8/2003 | Andivahis et al. |
| 2003/0149781 A1 | 8/2003 | Yared et al. |
| 2003/0172291 A1 | 9/2003 | Judge et al. |
| 2004/0064706 A1 | 4/2004 | Lin et al. |
| 2004/0139318 A1 | 7/2004 | Fiala et al. |
| 2004/0187018 A1 | 9/2004 | Owen et al. |
| 2004/0215672 A1 | 10/2004 | Pfitzner |
| 2004/0218763 A1 | 11/2004 | Gantman et al. |
| 2005/0024052 A1 | 2/2005 | Bendall et al. |
| 2005/0097350 A1 | 5/2005 | Patrick et al. |
| 2005/0097352 A1 | 5/2005 | Patrick et al. |
| 2005/0218215 A1 | 10/2005 | Lauden |
| 2005/0221268 A1 | 10/2005 | Chaar et al. |
| 2005/0237962 A1 * | 10/2005 | Upp .................. H04W 8/26 370/313 |
| 2005/0240522 A1 | 10/2005 | Kranzley et al. |
| 2005/0268107 A1 † | 12/2005 | Harris |
| 2005/0268326 A1 | 12/2005 | Bhargavan et al. |
| 2006/0020495 A1 * | 1/2006 | Baker .................. G06Q 40/08 705/4 |
| 2006/0021018 A1 | 1/2006 | Hinton et al. |
| 2006/0024269 A1 | 2/2006 | Doyle et al. |
| 2006/0026304 A1 | 2/2006 | Price |
| 2006/0031938 A1 | 2/2006 | Choi |
| 2006/0059569 A1 | 3/2006 | Dasgupta et al. |
| 2006/0075475 A1 | 4/2006 | Boulos et al. |
| 2006/0090067 A1 * | 4/2006 | Edmonds ............. H04L 67/104 713/159 |
| 2006/0130139 A1 | 6/2006 | Sobel et al. |
| 2006/0140182 A1 * | 6/2006 | Sullivan ............... H04L 67/306 370/389 |
| 2006/0165060 A1 | 7/2006 | Dua |
| 2006/0182276 A1 | 8/2006 | Sandhu et al. |
| 2006/0184787 A1 | 8/2006 | Sandhu et al. |
| 2006/0184788 A1 | 8/2006 | Sandhu et al. |
| 2006/0242692 A1 | 10/2006 | Thione et al. |
| 2006/0282660 A1 * | 12/2006 | Varghese ............. G07F 7/1041 713/155 |
| 2007/0016948 A1 | 1/2007 | Dubrovsky et al. |
| 2007/0027961 A1 | 2/2007 | Holzer |
| 2007/0033148 A1 | 2/2007 | Cahill |
| 2007/0081667 A1 | 4/2007 | Hwang |
| 2007/0101145 A1 | 5/2007 | Sachdeva et al. |
| 2007/0143860 A1 | 6/2007 | Hardt |
| 2007/0156592 A1 | 7/2007 | Henderson |
| 2007/0156659 A1 | 7/2007 | Lim |
| 2007/0185978 A1 | 8/2007 | Montulli |
| 2007/0186103 A1 * | 8/2007 | Randle .................. G06F 21/31 713/168 |
| 2007/0186106 A1 | 8/2007 | Ting et al. |
| 2007/0199060 A1 | 8/2007 | Touboul |
| 2007/0204016 A1 | 8/2007 | Kunz et al. |
| 2007/0228148 A1 | 10/2007 | Rable |
| 2007/0250914 A1 | 10/2007 | Fazal et al. |
| 2007/0254631 A1 | 11/2007 | Spooner |
| 2007/0258594 A1 | 11/2007 | Sandhu et al. |
| 2007/0284429 A1 | 12/2007 | Beeman |
| 2007/0297607 A1 | 12/2007 | Ogura et al. |
| 2008/0004964 A1 | 1/2008 | Messa et al. |
| 2008/0010665 A1 | 1/2008 | Hinton et al. |
| 2008/0012041 A1 | 1/2008 | Kesler |
| 2008/0034413 A1 | 2/2008 | He et al. |
| 2008/0049642 A1 | 2/2008 | Gudipudi et al. |
| 2008/0059804 A1 | 3/2008 | Shah et al. |
| 2008/0069347 A1 | 3/2008 | Brown et al. |
| 2008/0120411 A1 | 5/2008 | Eberle |
| 2008/0134311 A1 | 6/2008 | Medvinsky et al. |
| 2008/0201186 A1 | 8/2008 | Poon et al. |
| 2008/0229104 A1 | 9/2008 | Ju et al. |
| 2008/0301669 A1 | 12/2008 | Rao et al. |
| 2009/0037982 A1 † | 2/2009 | Wentker |
| 2009/0055906 A1 | 2/2009 | Von |
| 2009/0077060 A1 | 3/2009 | Sermersheim et al. |
| 2009/0083225 A1 | 3/2009 | Jacobs et al. |
| 2009/0167489 A1 | 7/2009 | Nan et al. |
| 2009/0187986 A1 | 7/2009 | Ozeki |
| 2009/0210705 A1 | 8/2009 | Chen |
| 2009/0254978 A1 | 10/2009 | Rouskov et al. |
| 2009/0259848 A1 | 10/2009 | Williams et al. |
| 2009/0271863 A1 | 10/2009 | Govindavajhala et al. |
| 2009/0288148 A1 * | 11/2009 | Headley ................ H04L 9/32 726/5 |
| 2009/0300596 A1 | 12/2009 | Tyhurst et al. |
| 2009/0300707 A1 | 12/2009 | Garimella et al. |
| 2009/0305732 A1 * | 12/2009 | Marcellino ............. H04L 51/24 455/466 |
| 2009/0328178 A1 | 12/2009 | Mcdaniel et al. |
| 2010/0002378 A1 | 1/2010 | Chen et al. |
| 2010/0011433 A1 | 1/2010 | Harrison et al. |
| 2010/0018000 A1 | 1/2010 | Hsu |
| 2010/0023781 A1 | 1/2010 | Nakamoto |

(56) References Cited

U.S. PATENT DOCUMENTS

| | | |
|---|---|---|
| 2010/0026302 A1 | 2/2010 | Doty et al. |
| 2010/0036931 A1 | 2/2010 | Certain et al. |
| 2010/0042954 A1 | 2/2010 | Rosenblatt et al. |
| 2010/0069104 A1 | 3/2010 | Neil et al. |
| 2010/0100725 A1 | 4/2010 | Ozzie et al. |
| 2010/0100924 A1 | 4/2010 | Hinton |
| 2010/0100945 A1* | 4/2010 | Ozzie ............ G06Q 20/40 726/5 |
| 2010/0107225 A1 | 4/2010 | Spencer et al. |
| 2010/0114740 A1 | 5/2010 | Dominguez et al. |
| 2010/0115578 A1 | 5/2010 | Nice et al. |
| 2010/0121767 A1* | 5/2010 | Coulter ............ G06Q 20/382 705/67 |
| 2010/0125737 A1 | 5/2010 | Kang |
| 2010/0131755 A1 | 5/2010 | Zhu et al. |
| 2010/0132017 A1* | 5/2010 | Robinson ............ H04L 63/08 726/5 |
| 2010/0180001 A1* | 7/2010 | Hardt ............ H04L 12/189 709/207 |
| 2010/0186082 A1 | 7/2010 | Ladki et al. |
| 2010/0202609 A1 | 8/2010 | Sandhu et al. |
| 2010/0216425 A1 | 8/2010 | Smith |
| 2010/0217986 A1 | 8/2010 | Schneider |
| 2010/0233996 A1 | 9/2010 | Herz et al. |
| 2010/0257610 A1 | 10/2010 | Hohl |
| 2010/0263021 A1 | 10/2010 | Arnott et al. |
| 2010/0274859 A1 | 10/2010 | Bucuk |
| 2010/0319068 A1 | 12/2010 | Abbadessa et al. |
| 2010/0330969 A1 | 12/2010 | Kim et al. |
| 2011/0026716 A1 | 2/2011 | Tang et al. |
| 2011/0055903 A1 | 3/2011 | Leggette |
| 2011/0086616 A1 | 4/2011 | Brand et al. |
| 2011/0107389 A1 | 5/2011 | Chakarapani |
| 2011/0113484 A1 | 5/2011 | Zeuthen |
| 2011/0119765 A1 | 5/2011 | Hering et al. |
| 2011/0138469 A1 | 6/2011 | Ye et al. |
| 2011/0145900 A1 | 6/2011 | Chern |
| 2011/0179472 A1 | 7/2011 | Ganesan |
| 2011/0197266 A1 | 8/2011 | Chu et al. |
| 2011/0197267 A1 | 8/2011 | Gravel et al. |
| 2011/0219449 A1 | 9/2011 | St et al. |
| 2011/0225637 A1 | 9/2011 | Counterman |
| 2011/0231265 A1 | 9/2011 | Brown et al. |
| 2011/0277025 A1 | 11/2011 | Counterman |
| 2011/0302410 A1 | 12/2011 | Clarke et al. |
| 2011/0302630 A1 | 12/2011 | Nair et al. |
| 2011/0307403 A1* | 12/2011 | Rostampour ........ G06Q 50/265 705/325 |
| 2012/0029084 A1 | 2/2012 | Wong |
| 2012/0030093 A1 | 2/2012 | Farias |
| 2012/0060360 A1 | 3/2012 | Liu |
| 2012/0063601 A1 | 3/2012 | Hart |
| 2012/0066501 A1* | 3/2012 | Xiong ............ H04L 9/3271 713/171 |
| 2012/0090028 A1 | 4/2012 | Lapsley et al. |
| 2012/0096274 A1 | 4/2012 | Campagna et al. |
| 2012/0117229 A1 | 5/2012 | Van et al. |
| 2012/0117626 A1 | 5/2012 | Yates et al. |
| 2012/0151567 A1 | 6/2012 | Chayanam et al. |
| 2012/0198050 A1 | 8/2012 | Maki et al. |
| 2012/0198228 A1 | 8/2012 | Oberheide et al. |
| 2012/0216239 A1 | 8/2012 | Yadav et al. |
| 2012/0227098 A1 | 9/2012 | Obasanjo et al. |
| 2012/0254957 A1 | 10/2012 | Fork et al. |
| 2012/0278454 A1 | 11/2012 | Stewart et al. |
| 2012/0290841 A1 | 11/2012 | Jentzsch |
| 2012/0300931 A1 | 11/2012 | Ollikainen et al. |
| 2012/0317287 A1 | 12/2012 | Amitai et al. |
| 2012/0321086 A1 | 12/2012 | D'Souza et al. |
| 2013/0004200 A1 | 1/2013 | Okabe |
| 2013/0008110 A1 | 1/2013 | Rothwell |
| 2013/0012429 A1 | 1/2013 | Eddowes et al. |
| 2013/0017968 A1 | 1/2013 | Gurtner et al. |
| 2013/0024628 A1 | 1/2013 | Benhase et al. |
| 2013/0042002 A1 | 2/2013 | Cheeniyil et al. |
| 2013/0055233 A1 | 2/2013 | Hatton et al. |
| 2013/0055247 A1 | 2/2013 | Hiltgen et al. |
| 2013/0060708 A1 | 3/2013 | Oskolkov et al. |
| 2013/0067538 A1 | 3/2013 | Dharmarajan et al. |
| 2013/0074061 A1 | 3/2013 | Averbuch et al. |
| 2013/0074601 A1 | 3/2013 | Jackson |
| 2013/0081101 A1 | 3/2013 | Baer et al. |
| 2013/0086210 A1 | 4/2013 | Yiu et al. |
| 2013/0086658 A1 | 4/2013 | Kottahachchi et al. |
| 2013/0091544 A1 | 4/2013 | Oberheide et al. |
| 2013/0097585 A1 | 4/2013 | Jentsch et al. |
| 2013/0117826 A1 | 5/2013 | Gordon et al. |
| 2013/0124292 A1 | 5/2013 | Juthani |
| 2013/0125226 A1 | 5/2013 | Shah et al. |
| 2013/0174246 A1 | 7/2013 | Schrecker et al. |
| 2013/0179681 A1 | 7/2013 | Benson et al. |
| 2013/0239167 A1 | 9/2013 | Sreenivas et al. |
| 2013/0239168 A1 | 9/2013 | Sreenivas et al. |
| 2013/0239177 A1 | 9/2013 | Sigurdson et al. |
| 2013/0246281 A1 | 9/2013 | Yamada et al. |
| 2013/0276142 A1 | 10/2013 | Peddada |
| 2013/0310006 A1 | 11/2013 | Chen et al. |
| 2013/0311776 A1 | 11/2013 | Besehanic |
| 2013/0326224 A1 | 12/2013 | Yavuz |
| 2013/0326493 A1 | 12/2013 | Poonamalli et al. |
| 2014/0001975 A1 | 1/2014 | Lee et al. |
| 2014/0019752 A1 | 1/2014 | Yin et al. |
| 2014/0020051 A1 | 1/2014 | Lu et al. |
| 2014/0020184 A1 | 1/2014 | Loth |
| 2014/0047546 A1 | 2/2014 | Sidagni |
| 2014/0188796 A1 | 7/2014 | Fushman et al. |
| 2014/0201841 A1 | 7/2014 | Deshpande et al. |
| 2014/0208405 A1 | 7/2014 | Hashai |
| 2014/0235230 A1 | 8/2014 | Raleigh |
| 2014/0237236 A1 | 8/2014 | Kalinichenko et al. |
| 2014/0244993 A1 | 8/2014 | Chew |
| 2014/0245278 A1 | 8/2014 | Zellen |
| 2014/0245396 A1 | 8/2014 | Oberheide et al. |
| 2014/0247140 A1 | 9/2014 | Proud |
| 2014/0297840 A1 | 10/2014 | Qureshi |
| 2014/0310415 A1 | 10/2014 | Kirner et al. |
| 2014/0351954 A1 | 11/2014 | Brownell et al. |
| 2014/0376543 A1 | 12/2014 | Malatack et al. |
| 2015/0002646 A1 | 1/2015 | Namii |
| 2015/0012914 A1 | 1/2015 | Klein et al. |
| 2015/0026461 A1 | 1/2015 | Devi |
| 2015/0172321 A1 | 6/2015 | Kirti et al. |
| 2015/0213268 A1 | 7/2015 | Nance et al. |
| 2015/0237026 A1 | 8/2015 | Kumar |
| 2015/0242643 A1 | 8/2015 | Hankins et al. |
| 2015/0312233 A1 | 10/2015 | Graham et al. |
| 2015/0381662 A1 | 12/2015 | Nair et al. |
| 2016/0005696 A1 | 1/2016 | Tomohiro |
| 2016/0018007 A1 | 1/2016 | Eckholz |
| 2016/0021117 A1 | 1/2016 | Harmon et al. |
| 2016/0028639 A1 | 1/2016 | Wong et al. |
| 2016/0030023 A1 | 2/2016 | Hayakawa et al. |
| 2016/0056962 A1 | 2/2016 | Mehtälä |
| 2016/0080366 A1 | 3/2016 | Agarwal |
| 2016/0099963 A1 | 4/2016 | Mahaffey et al. |
| 2016/0164866 A1 | 6/2016 | Oberheide et al. |
| 2016/0180072 A1 | 6/2016 | Ligatti et al. |
| 2016/0180343 A1 | 6/2016 | Poon et al. |
| 2016/0212129 A1 | 7/2016 | Johnston et al. |
| 2016/0286391 A1 | 9/2016 | Khan |
| 2016/0300231 A1 | 10/2016 | Shavell et al. |
| 2016/0366589 A1 | 12/2016 | Jean |
| 2017/0006060 A1* | 1/2017 | Venkataramani ....... H04W 4/02 |
| 2017/0039242 A1 | 2/2017 | Milton et al. |
| 2017/0169066 A1 | 6/2017 | Mantri et al. |
| 2017/0214701 A1 | 7/2017 | Hasan |
| 2017/0325087 A1† | 11/2017 | Drokov |
| 2018/0027006 A1 | 1/2018 | Zimmermann et al. |

(56) References Cited

U.S. PATENT DOCUMENTS

2018/0205726 A1    7/2018  Chari et al.
2018/0268404 A1*   9/2018  Lindelsee .............. G06Q 20/40

OTHER PUBLICATIONS

Mizuno, Shintaro, Kohji Yamada, and Kenji Takahashi. "Authentication using multiple communication channels." Proceedings of the 2005 workshop on Digital identity management. 2005, pp. 54-62. (Year: 2005).*

"Neuenhofen, Kay, and Mathew Thompson. ""A secure marketplace for mobile Java agents."" Proceeding of the second international Conference on Autonomous agents. ACM, 1998. {pp. 212-218}.".

"Aloul S Zahidi; et al. "Two factor authentication using mobile phones," 2009 IEEE/ACS International Conference on Computer Systems and Applications, Rabat, 2009, pp. 641-644.", Feb. 6, 2018 00:00:00.0.

"Bonneau Joseph; et al. "Passwords and the evolution of imperfect authentication." Communications of the ACM 58.7 (2015): 78-87.", Feb. 6, 2018 00:00:00.0.

"Goldfeder et al., Securing Bitcoin wallets via a new DSA/ECDSA threshold signature scheme, http://www.cs.princeton.edu/~stevenag/threshold_sigs.pdf".

"Kher Vishal; et al. "Securing distributed storage: challenges, techniques and systems." Proceedings of the 2005 ACM workshop on Storage security and survivability. ACM, 2005, pp. 9-25.", Feb. 6, 2018 00:00:00.0.

"Edge, Kenneth, et al. "The use of attack and protection trees to analyze security for an online banking system." System Sciences, 2007. HICSS 2007. 40th Annual Hawaii International Conference on. IEEE, 2007.".

"Simske et al., "APEX: Automated Policy Enforcement eXchange", Sep. 21-24, 2010, ACM, pp. 139-142.".

"Symantec, Administration Guide for Symantec TM Endpoint Protection and Symantec Network Access Control, Aug. 1, 2007".

"Symantec, Administration guide for symantec Endpoint protection and symantec network access control, 2009, version 11.00.05.00.00".

* cited by examiner
† cited by third party

SYSTEM AND METHOD OF NOTIFYING MOBILE DEVICES TO COMPLETE TRANSACTIONS

CROSS-REFERENCE TO RELATED APPLICATIONS

This application is a continuation of U.S. application Ser. No. 15/971,193, filed 4 May 2018, which is a continuation of U.S. Pat. No. 9,992,194, filed 29 Nov. 2016, which is a continuation of U.S. Pat. No. 9,544,143, filed 2 Mar. 2011, which claims the benefit of U.S. Provisional Application No. 61/309,885, filed 3 Mar. 2010, all of which are incorporated herein in their entireties by this reference.

TECHNICAL FIELD

This invention relates generally to the digital security services field, and more specifically to a new and useful system and method of notifying mobile devices to complete transactions in the digital security field.

BACKGROUND

Fraudulent transactions, whether executed online by a malicious party who has stolen a user's online banking password or offline by a malicious party entering a restricted building using a forged identification card, are indicators of a lack of authentication in present day security systems. Similarly, authorization (permission to complete a transaction) is limited without a strong notion of authentication. Traditionally, techniques for authentication are classified into several broad classes such as "what you know" (e.g., passwords or a social security number), "what you have" (e.g., physical possessions such as ATM cards or a security dongle), and "what you are" (e.g., biometric information such as a finger print or DNA). However, many of these solutions are burdensome to users, requiring the user to remember information or carry extra devices to complete a transaction. Thus, there is a need in the digital security services field to create a new and useful system and method of notifying mobile devices to complete transactions. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
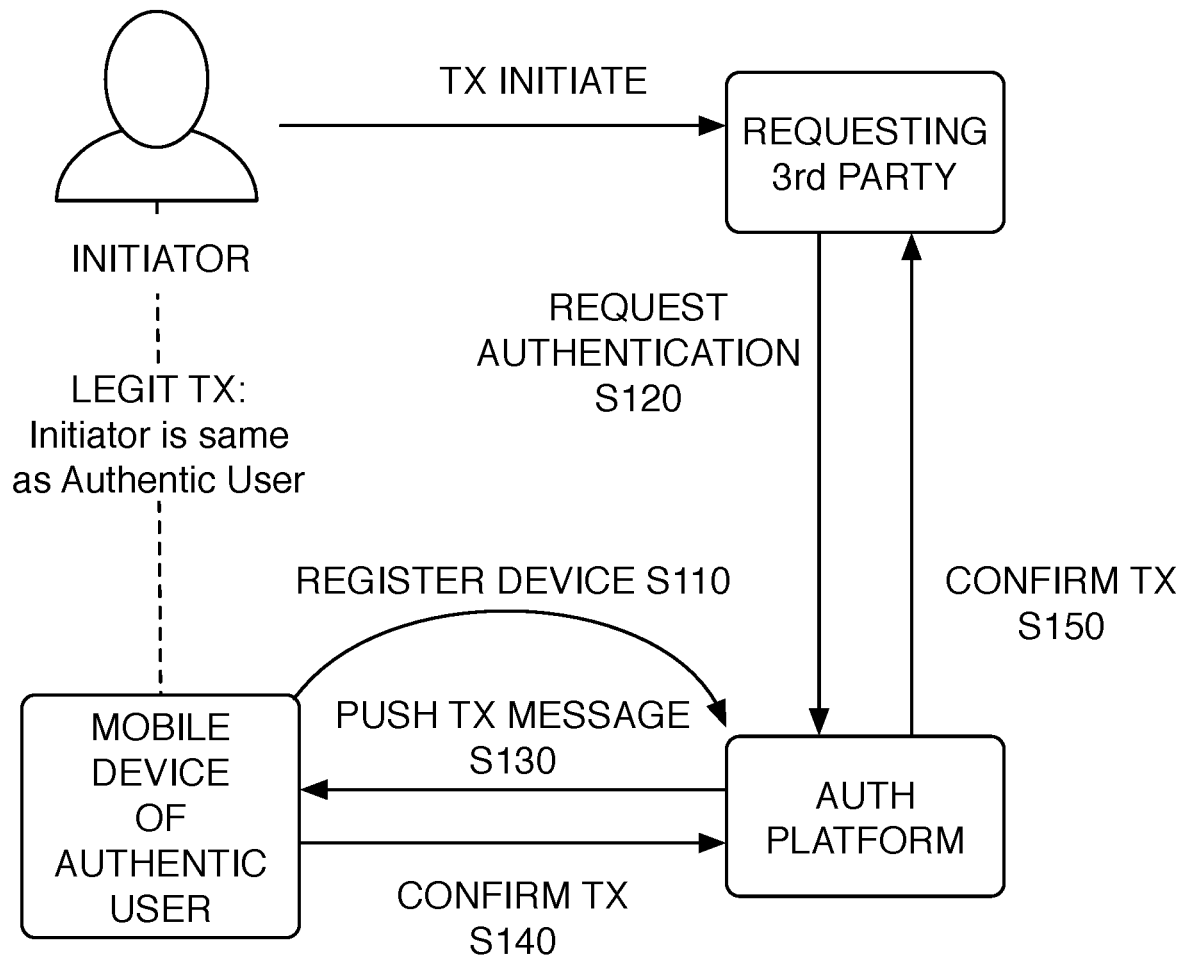
FIGS. 1 and 2 are schematic representations of a method of a preferred embodiment for authenticating a transaction.
Figure 2:
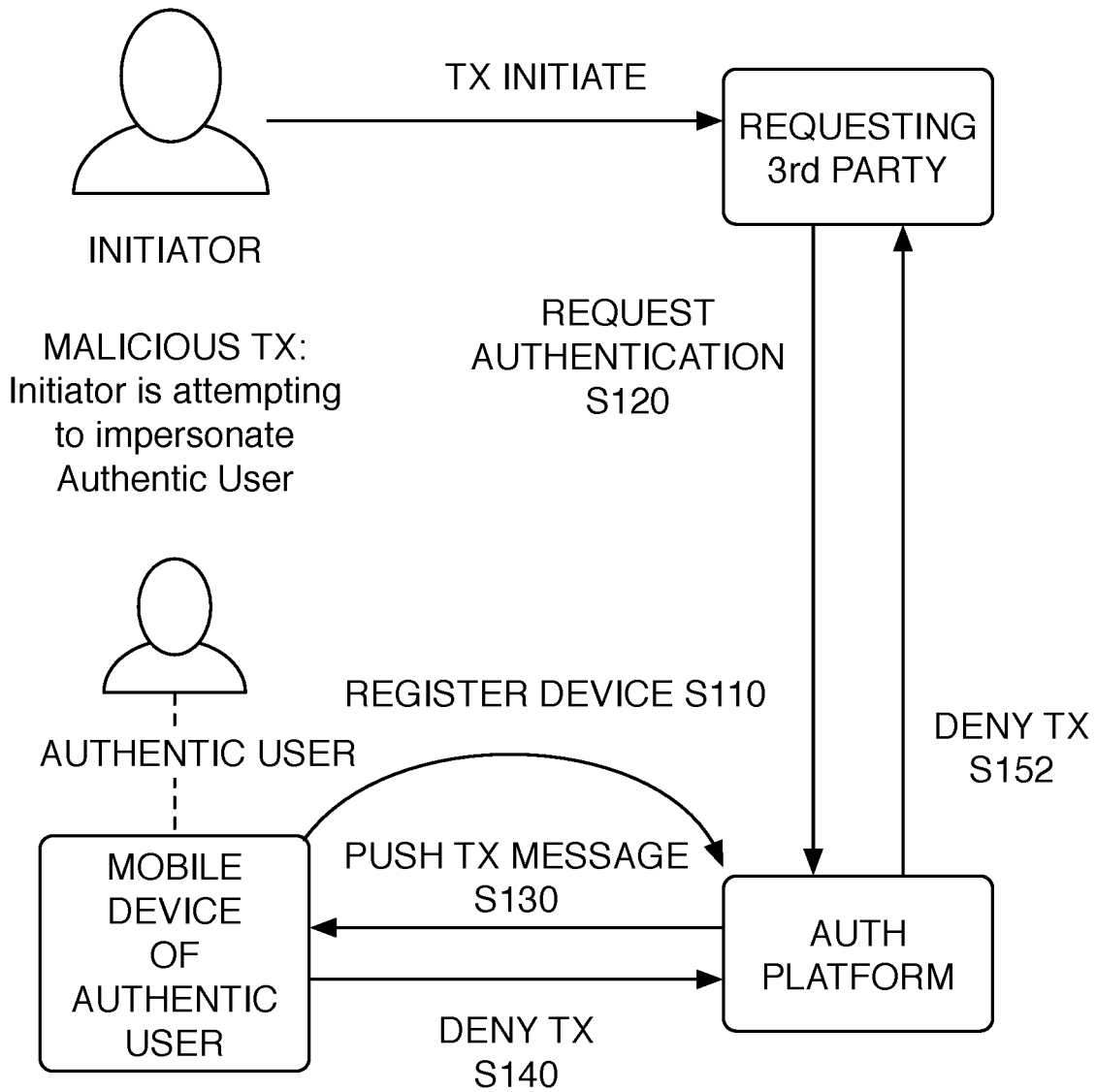
Figure 3:
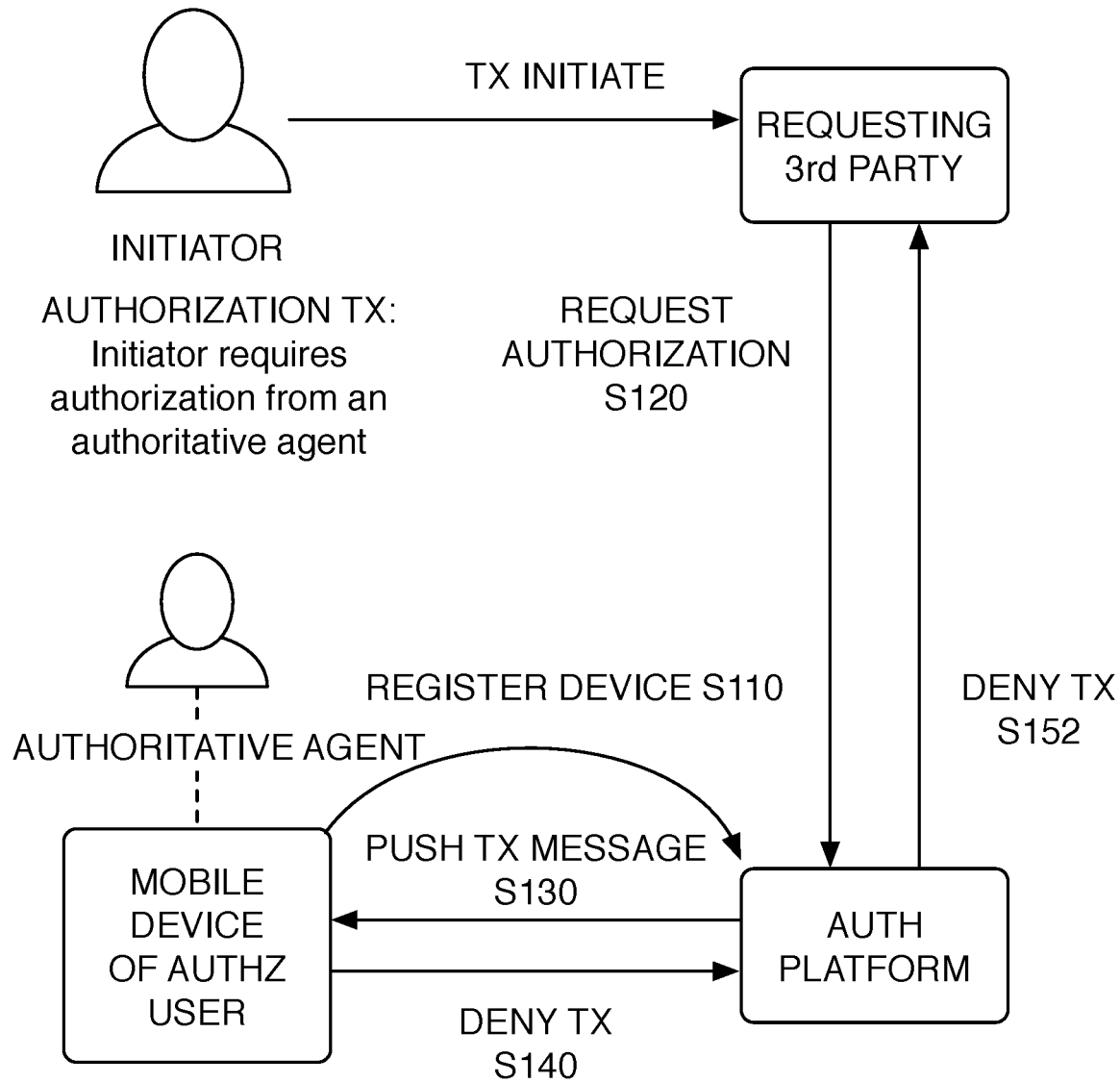
FIG. 3 is a schematic representation of a method of a preferred embodiment for authorizing a transaction.

As shown in FIGS. 1-3, the method of the preferred embodiments for notifying mobile devices to complete transactions includes registering an authority device for an account on an auth platform S110, receiving a transaction request from an initiator to the auth platform S120, messaging the authority device with the transaction request S130, receiving an authority agent response from the authority device to the auth platform S140, if the authority agent response confirms the transaction, communicating a confirmed transaction to the initiator S150, and if the authority agent response denies the transaction, communicating a denied transaction to the initiator S152. The method functions to use push-based challenges on mobile device for the authentication and/or authorization of parties involved in a transaction. The method functions to utilize non-intrusive techniques while providing improved security. The pushed messages preferably alert a user to the transaction request in real-time such that a decision of confirmation or denial of a transaction can be communicated to a requesting party with minimal time lag (e.g., preferably less than a minute, and more preferably less than 10 seconds). The method may be employed as standalone transaction validation or incorporated into a multifactor system. The method may be used in application such as web-based applications, remote access credentials, privileged account management, financial transactions, password recovery/reset mechanisms, physical access control, Automatic Teller Machine (ATM) withdrawals, domain name transfers, online or offline transactions, building access security, or any suitable application requiring authentication and/or authorization.

The method is preferably performed by an auth platform that communicates with a client of an initiating agent and an authority device associated with an account of the auth platform. The auth platform is preferably an internet accessible server that may be hosted on a distributed computing system, but may be hosted on any suitable platform. The initiating agent is typically a user or process that initiates a transaction. The requested transaction is preferably initiated by the initiating agent through a client such as a website, application, or device (e.g., an ATM machine). For authentication, the initiator agent may be a legitimate party or a malicious party attempting to fraudulently impersonate the legitimate party. For authorization, the initiating agent may be a legitimate authenticated party but may require approval from other parties to perform the action of the transaction. The authority device is preferably a device associated with an authentic agent that is a user or process that is legitimately authenticated or authorized to execute transactions. Even if a malicious entity were attempting to impersonate a user or authentic agent through stolen credentials or other means, they would—ideally—lack the authority device to complete a transaction.

Figure 4:
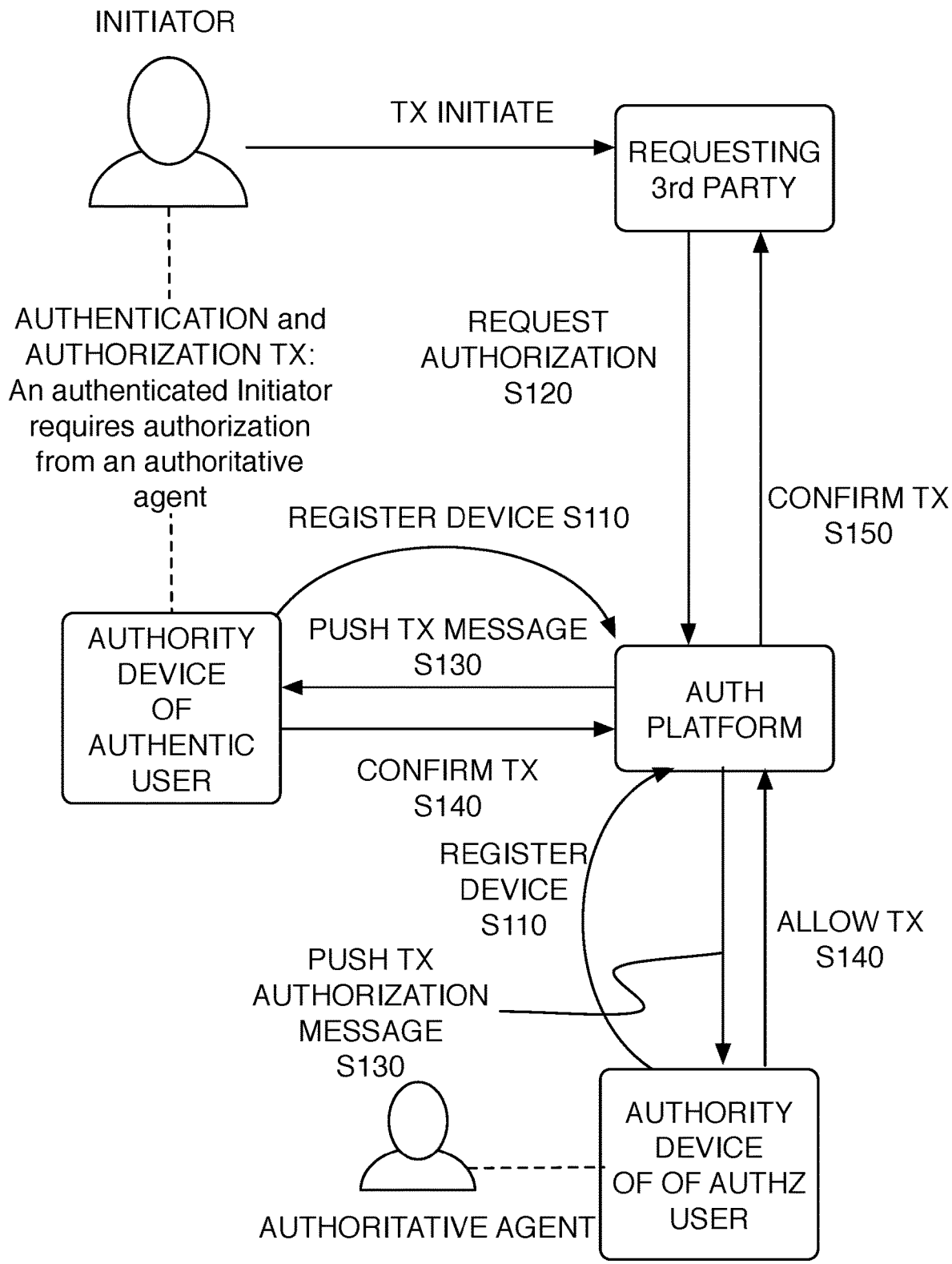
FIG. 4 is a schematic representation of a method of a preferred embodiment for authenticating and authorizing a transaction.
Figure 5:
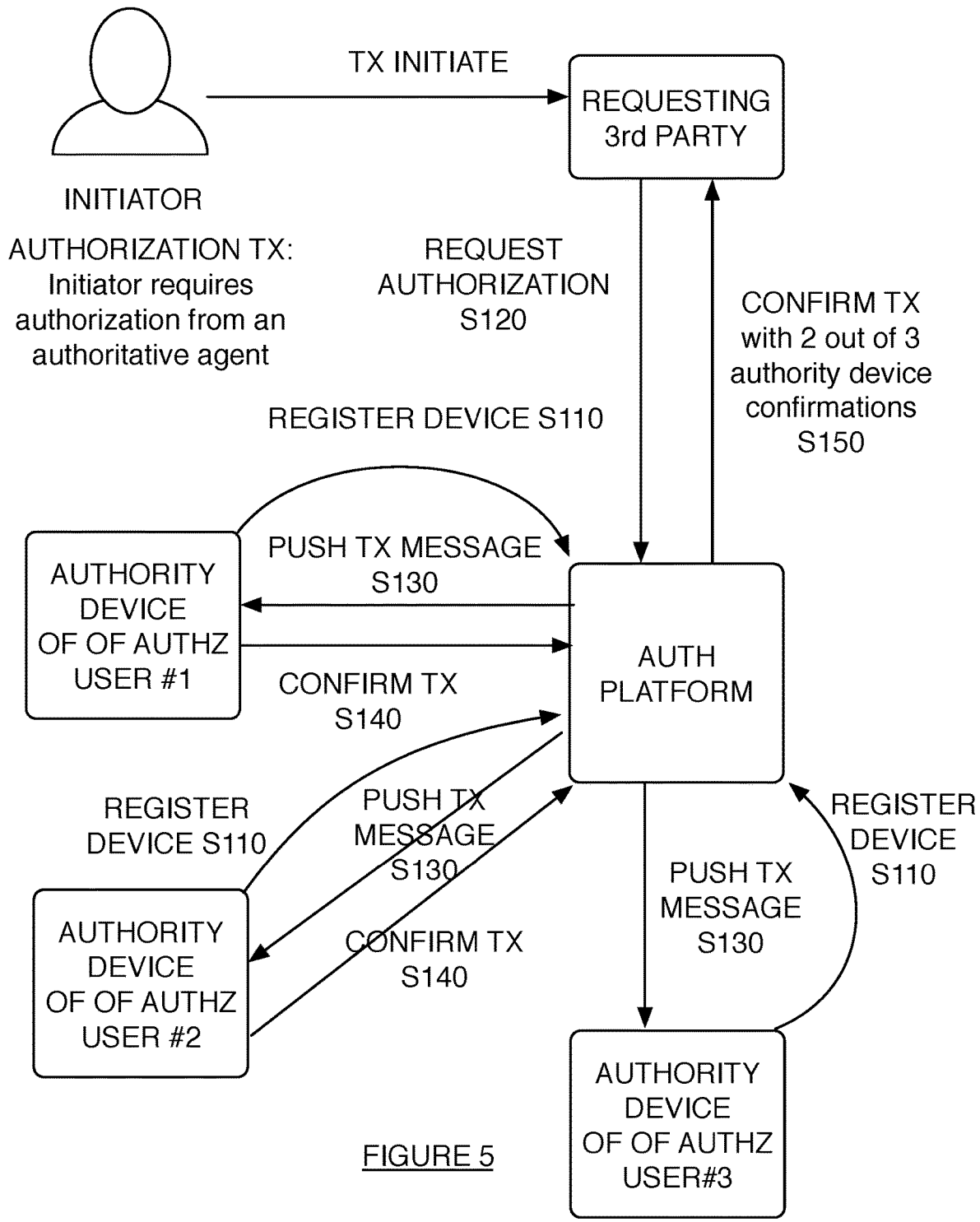
FIG. 5 is a schematic representation of a method of a preferred embodiment with a plurality of authority devices.

Step S110, which includes registering an authority device for an account on an auth platform, functions to identify a device of an agent that is permitted to authenticate or authorize transactions. The registration preferably occurs prior to a transaction request, and is preferably performed during an initial setup of an account on the auth platform. During the setup authentication and/or authorization rules are preferably set. The authority device is preferably a mobile computing device possessed by an authentic user or an authorized agent. The mobile device is preferably a mobile phone, tablet computer, smartphone, personal data assistant (PDA), personal computer, and/or any suitable computing device. The authority device preferably has access to a network over which communication with the auth platform is performed, such as a WiFi network, local-area network, telephony network, short message service (SMS) network, multimedia messaging service (MMS), or any suitable network. A plurality of devices may additionally be registered, as shown in FIG. 5. A second authority device may provide a backup communication point if a primary authority device does not respond. For example, after attempting to contact a primary authority device, the auth platform may message a secondary authority device for authentication or authorization. Or, alternatively, a threshold of two confirmations may need to be received to authorize a transaction. Additionally, a first authority device may be registered for authenticating the identity of an agent of the transaction request, and a second authority device may be registered for authorizing an action of an agent such that authentication and authorization may both be enabled, as shown in FIG. 4.

Step S120, which includes receiving a transaction request from an initiator to the auth platform, functions to initiate a transaction. The transaction is preferably any event, transfer, action, or activity that requires authentication and/or authorization of an involved party. Exemplary transactions may include logging into a website, application or computer system; a user withdrawing money from an ATM; a user initiating a "forgotten password" procedure; a user attempting to enter a restricted area of a building or environment; a payment exchange between two entities; a user attempting to perform a restricted action in a computer system; and/or any suitable application requiring authentication and/or authorization. Authentication preferably includes validating the identity of at least one involved party relevant to a transaction. Authorization preferably includes validating authority or permission of an entity to execute a transaction. For authentication, the authority device preferably belongs to the authentic user for self-approval of transactions. For authorization, the authority device preferably belongs to an authoritative user that is preferably in charge of regulating transactions of a user involved in the transaction. The transactions are preferably initiated in an online environment, where parties may be communicating using a computing device or public/private network, but the transactions may alternatively occur offline where parties may be interacting in the real world. The user or device initiating the transaction is ideally a legitimate party, as shown in FIG. 1, but in the situations where a malicious party initiates or participates in the transaction, the method is preferably able to properly identify such a situation, as shown in FIG. 2. After a malicious transaction is prevented the approval rules for a transaction may be dynamically altered to increase security. The transaction is preferably sent from a requesting entity such as a website, application, or device. The requesting entity is typically a system in communication with the auth platform. An application programming interface (API) or any suitable protocol is preferably used to communicate between the requesting entity and the auth platform. In one variation, the communication sent from the requester is encrypted and the authority device preferably decrypts the information. This variation preferably prevents the auth platform from inspecting or accessing the communicated information which may be applicable when a third party is passing sensitive information through the auth platform. As an alternative variation, the communication between the requester and the auth platform is preferably encrypted or otherwise cryptographically protected and communication between the auth platform and the authority device verifies that the communication is from the authority device. Any suitable steps may be taken to secure the communication between the requesting entity, the auth platform and the authority device.

Step S130, which includes messaging the authority device with the transaction request, functions to push a notification to a secondary device for authentication or authorization. The authority device is preferably a device only the authentic user or an authorized user would possess. The message is preferably sent through a communication channel between the authority device and the auth platform. The communication channel is preferably a push notification service provided through the authority device. The communication channel may alternatively be a short message system SMS network, email, a instant message, an in-app notification system, web based websocket or publication-subscription channels, image based transmission of transaction information such as through QR-codes captured by a camera, or any suitable technique for messaging the device. The messages preferably appear on the authority device or create an alert in substantially real-time (e.g., in less than 5 minutes). The realtime aspect of the messaging functions to enable authentication and authorization at the time of the transaction. In one variation, tracking a registered authority device may additionally be performed by the auth platform. For example, in a persistent TCP/IP connection model, a mobile device moving from a service provider data network to a WiFi network may change IP addresses and therefore initiate a new persistent connection. Upon receiving that new connection and an identifier of the mobile device, the auth platform preferably updates the state of the device for the account associated with that device. Then, the proper connection is preferably used for messaging the authority device. Some communication channels may have limited throughput and lack the capability to present a full message from the auth platform. For example, SMS messages have a 160 character limit. An initial message may include a unique identifier, which can then be used to retrieve a full message. For example, the SMS message may include a URL link or code which can be used to retrieve a full message from an application or website. The full message may provide additional information and options for a transaction response. The messages transmitted over the communication channel may additionally be cryptographically signed and encrypted using an established setup between the auth device and the auth platform. Additionally the messages preferably include transaction information (i.e., metadata). The transaction information may include account or entity name, transaction details, location and time of transaction, IP address of initiating host, geolocation of the IP address or any suitable information or any suitable data on the transaction. In one example an online bank transfer may have a message with transaction information including payer, payee, account numbers, transfer amount, and transaction date and time.

Step S140, which includes receiving an authority agent response from the authority device to the auth platform, functions to process a response from an authentic user or authorized user. The response preferably confirms or denies a transaction. The confirmation and denial of a transaction may additionally be set to indicate any suitable form of response. Preferably, the initial options are to accept or reject a transaction. Additionally, if a transaction is rejected a reason for rejection may be included such as "canceled because of change of mind" or "possible malevolent transaction". Other variations may include a variety of options that may change based on the application. The available forms of responses may be included in the message information. Other forms of responses may allow a variety of multiple-choice options, variable setting options, or any suitable form of response input. For example, if a parent is acting as an authorization provider for an ATM withdraws made by a child, a message may be sent to a phone of the parent indicating that the child is attempting to withdraw a particular amount (e.g., $50). The parent may be able to respond allowing a withdrawal of only a lower amount (e.g., $20). As an additional sub-step to receiving an authority agent response, the response is preferably verified to be a legitimate response from the authority device as opposed to an entity imitating the device. Secure Socket Layer (SSL), a Hash-based Message Authentication Code (HMAC), message signing, or any suitable cryptographic protocol may be used to verify the response is from the authority device.

Step S150 and S152, which includes if the authority agent response confirms the transaction, communicating a confirmed transaction to the initiator, and if the authority agent response denies the transaction, communicating a denied transaction to the initiator, function to communicate the authentication and/or authorization to the initiator of the transaction. Any suitable response to a transaction is preferably communicated back to the requesting entity (e.g., a third party website or an ATM machine). The requesting entity can then preferably take appropriate action. If the transaction is confirmed or approved, the transaction proceeds. If the transaction is denied or altered, the requesting entity preferably halts or prevents the transaction. The requesting entity can preferably use the transaction response to modify a transaction state in any suitable manner. Based on the variety of responses from authentic users and/or authorized users, rules may determine when to confirm or deny a transaction. In a variation of the method, there may be a plurality of authority devices registered for authorization and/or authentication. A rule may be setup for which authority devices to message, in what order, and the timing of the messaging. Additionally, rules may be set for received responses. A particular threshold for the number of responses from the plurality of authority devices may be set. For example, four authority devices may be messaged for authorization and at least three must confirm the transaction for it to be confirmed. In another example, a plurality of authority devices for authentication may be registered, and the authority devices are messaged one after the other until at least one responds. The response from an authority agent may alternatively be passed on to the requesting entity with no analysis.

An alternative embodiment preferably implements the above methods in a computer-readable medium storing computer-readable instructions. The instructions are preferably executed by computer-executable components preferably integrated with an auth platform. The auth platform is preferably hosted on a distributed computing system or cloud based platform but may alternatively be hosted in any suitable system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device. The auth platform preferably includes an API for third party services and devices to use in initiating transactions and interpreting responses from the auth platform. The platform preferably includes a communication channel such as a public or private network or SMS network to communicate with at least one authority device. The authority device is preferably a mobile phone but may be any suitable personal computing device.

As a person skilled in the art will recognize from the previous detailed description and from the figures and claims, modifications and changes can be made to the preferred embodiments of the invention without departing from the scope of this invention defined in the following claims.

We claim:

1. A method of authenticating a web-based application, the method comprising:
    registering a mobile communication device for an authentication account at a remote authentication platform;
    at the remote authentication platform comprising an Internet-accessible server hosted on a distributed computing system:
        tracking the mobile communication device using an IP address and an identifier of the mobile communication device by identifying a change in the IP address of the mobile communication device when the mobile communication device moves from a first network to a second network and updating, at the authentication account at the remote authentication platform, a state of the mobile communication device in which a persistent connection is newly established;
        receiving from a client, via a first communication channel, transaction data relating to an attempt by a user to access the web-based application via the client;
        preventing the remote authentication platform from inspecting one or more features of the transaction data from a service provider;
        identifying the authentication account associated with the mobile communication device based on the transaction data;
        determining a second communication channel among at least two channels based on the state of the mobile communication device;
        responsive to identifying the authentication account, transmitting to the mobile communication device, via the second communication channel, an authentication message;
        receiving, via the second communication channel, a response to the authentication message from the mobile communication device; and
        transmitting to the client, via the first communication channel, a confirmation or a denial of the attempt to access the web-based application based on the response to the authentication message from the client.

2. The method according to claim 1, wherein the client comprises one of a client application, a client device, and a client website that communicates, via the first communication channel, with the Internet-accessible server of the remote authentication platform.

3. The method according to claim 1, further comprising:
    initiating the persistent connection of the second communication channel different from another persistent connection of the first communication channel between the remote authentication platform and the mobile communication device; and
    messaging between the mobile communication device and the remote authentication platform using the persistent connection.

4. The method according to claim 1,
    wherein preventing the remote authentication platform from inspecting the one or more features includes encrypting the one or more features of the transaction data at the service provider prior to transmitting the transaction data to the remote authentication platform and further comprising:

decrypting the one or more features of the transaction data at the mobile communication device.

5. The method of claim 1, further comprising:
setting one or more authorization rules that identify the mobile communication device and at least one other communication device for the authentication account and priority of each of the mobile communication device and the at least one other communication device; and
selecting the mobile communication device as a destination for the authentication message based on the one or more authorization rules.

6. A method of authenticating a digital transaction, the method comprising:
registering a mobile communication device for an authentication account at a remote authentication platform;
at the remote authentication platform comprising an Internet-accessible server hosted on a distributed computing system:
tracking the mobile communication device using an IP address and an identifier of the mobile communication device by identifying a change in the IP address of the mobile communication device when the mobile communication device moves from a first network to a second network and updating, at the authentication account at the remote authentication platform, a state of the mobile communication device in which a persistent connection is newly established;
receiving, via a first communication channel, from a service provider, transaction data relating to an attempt by a user to perform the digital transaction with the service provider;
preventing the remote authentication platform from inspecting one or more features of the transaction data from the service provider;
identifying the authentication account associated with the mobile communication device based on the transaction data;
determining a second communication channel among at least two channels based on the state of the mobile communication device;
responsive to identifying the authentication account, transmitting to the mobile communication device, via the second communication channel, an authentication message;
receiving, via the second communication channel, a response to the authentication message from the mobile communication device; and
transmitting, to the service provider, via the first communication channel, a confirmation of the digital transaction or a denial of the digital transaction based on the response to the authentication message from the mobile communication device.

7. The method according to claim 6, further comprising:
initiating the persistent connection between the remote authentication platform and the mobile communication device; and
messaging between the mobile communication device and the remote authentication platform using the persistent connection.

8. The method according to claim 6, wherein
if the user of the mobile communication device provides a denial input denying the digital transaction, additionally receiving, at the remote authentication platform, a selection input of one of a plurality of available denial responses identifying a reason for the denial input.

9. The method according to claim 6, wherein the digital transaction is initiated in an online environment over one or more communication networks.

10. The method according to claim 6, wherein:
if the service provider denies the digital transaction based on the response to the authentication message, dynamically altering, by the remote authentication platform, authentication requirements for future digital transactions involving the authentication account.

11. The method according to claim 6, wherein the second communication channel comprises a persistent connection provided via a push notification service associated with the mobile communication device.

12. The method according to claim 6, wherein the transaction data comprises a request to access a digital account maintained by the service provider.

13. The method according to claim 6, wherein the transaction data comprises a request to access a digital account through a website.

14. The method according to claim 6, wherein the transaction data comprises a permission request to perform an action on a computer system.

15. The method according to claim 6, wherein the authentication message comprises a size-limited message to the mobile communication device including a unique identifier of a full message that is larger than the size-limited message.

16. The method according to claim 6, further comprising:
completing the digital transaction if the response to the authentication message from the mobile communication device comprises a confirmation that confirms the digital transaction; and
communicating to the user the confirmation of the digital transaction.

17. The method according to claim 6, further comprising:
denying the digital transaction if the response to the authentication message from the mobile communication device comprises a denial that denies the digital transaction; and
communicating to the user the denial of the digital transaction.

18. A method of multi-factor authentication of a digital transaction, the method comprising:
prior to initiating the digital transaction, registering a multi-factor authentication account and registering a mobile communication device of a user in association with the multi-factor authentication account on a remote authentication service for performing a second factor of authentication for the digital transaction;
at a third-party service provider:
receiving, via a first communication channel, a transaction request from an initiator for initiating the digital transaction, the transaction request comprising user authentication credentials for performing a first factor of authentication at the third-party service provider;
authenticating the initiator based on the user authentication credentials; in response to a successful authentication of the initiator, transmitting, via one or more networks, transaction request data associated with the transaction request to the remote authentication service;
at the remote authentication service:
tracking the mobile communication device using an IP address and an identifier of the mobile communication device by identifying a change in the IP address of the mobile communication device when the mobile communication device moves from a first network to a second network and updating, at the multi-factor authentication account at the remote authentication service, a state of the mobile communication device in which a persistent connection is newly established;

preventing the remote authentication service from inspecting one or more features of the transaction request data from the third-party service provider;

determining a second communication channel among at least two channels based on the state of the mobile communication device;

receiving, via the second communication channel, the transaction request data from the third-party service provider, wherein the transaction request data comprises (i) details of the transaction request and (ii) multi-factor authentication account identification data;

using the multi-factor authentication account identification data to identify the multi-factor authentication account registered with and maintained by the remote authentication service;

using the multi-factor authentication account to identify the mobile communication device of the user that is registered in association with the multi-factor authentication account;

in response to identifying the mobile communication device that is registered in association with the multi-factor authentication account, transmitting, via a third communication channel, from the remote authentication service an authentication message to the mobile communication device, the authentication message comprising (a) the details of the transaction request and (ii) a request for either a confirmation input that confirms the details of the transaction request or a denial input that denies the details of the transaction request;

receiving, via the third communication channel, from the mobile communication device that has been registered, an authentication response to the authentication message, the authentication response comprising data of the confirmation input or data of the denial input;

transmitting, via the second communication channel, authentication response data relating to the authentication response to the third-party service provider; and completing the digital transaction or denying the digital transaction based on the authentication response data.

19. The method according to claim 18, further comprising:
   at the third-party service provider:
      in response to receiving the authentication response data, transmitting a response via the first communication channel to the transaction request from the third-party service provider to an electronic initiator device of the initiator that is distinct from the mobile communication device.

20. The method according to claim 18, further comprising:
   initiating the persistent connection different from another persistent connection of the first communication channel between the remote authentication service and the mobile communication device; and
   messaging between the mobile communication device and the remote authentication service using the persistent connection.

* * * * *